(12) United States Patent
Hayashi

(10) Patent No.: US 12,378,939 B2
(45) Date of Patent: Aug. 5, 2025

(54) HYDRAULIC MACHINE

(71) Applicant: YUMES FRONTIER INC., Mie (JP)

(72) Inventor: Yu Hayashi, Mie (JP)

(73) Assignee: YUMES FRONTIER INC., Mie (JP)

( * ) Notice: Subject to any disclaimer, the term of this patent is extended or adjusted under 35 U.S.C. 154(b) by 0 days.

(21) Appl. No.: 18/290,449

(22) PCT Filed: Mar. 31, 2022

(86) PCT No.: PCT/JP2022/016538
§ 371 (c)(1),
(2) Date: Nov. 13, 2023

(87) PCT Pub. No.: WO2022/239571
PCT Pub. Date: Nov. 17, 2022

(65) Prior Publication Data
US 2024/0247633 A1 Jul. 25, 2024

(30) Foreign Application Priority Data

May 14, 2021 (JP) ................................. 2021-082838
May 14, 2021 (JP) ................................. 2021-082839

(51) Int. Cl.
*F03B 13/08* (2006.01)
*F03B 11/02* (2006.01)

(52) U.S. Cl.
CPC .............. *F03B 13/08* (2013.01); *F03B 11/02* (2013.01)

(58) Field of Classification Search
CPC .... F03B 3/16; F03B 3/18; F03B 3/186; F03B 3/12; F03B 3/121; F03B 3/02;
(Continued)

(56) References Cited

U.S. PATENT DOCUMENTS

| 4,566,166 A * | 1/1986 | Donelson .................. F03B 3/16 |
| | | 29/889.22 |
| 2004/0253097 A1* | 12/2004 | Kao .......................... F03B 3/02 |
| | | 415/204 |

(Continued)

FOREIGN PATENT DOCUMENTS

| CN | 107725251 A | * | 2/2018 |
| CN | 111720252 A | * | 9/2020 |

(Continued)

OTHER PUBLICATIONS

International Search Report dated Jun. 14, 2022, for International Patent Application No. PCT/JP2022/016538.

*Primary Examiner* — Courtney D Heinle
*Assistant Examiner* — Ryan C Clark
(74) *Attorney, Agent, or Firm* — KARCESKI IP LAW, PLLC

(57) ABSTRACT

A hydraulic machine includes a casing and a runner. The casing includes a main flow path and a fixed flow path. The main flow path is disposed outward and has a spiral shape. An inner diameter decreases toward a center of the spiral. The fixed flow path is disposed inward and introduces water from the main flow path into the runner. The runner is connected to a main shaft along a rotation axis of the runner and includes a plurality of runner vanes. At least one of the plurality of runner vanes has a pressure surface that receives pressure in an inflow direction from the water flowing into the runner through the fixed flow path. In a cross section of the runner vane perpendicular to a direction of the rotation axis, an outlet angle is 0° or more and less than 20°.

5 Claims, 9 Drawing Sheets

(58) Field of Classification Search
CPC .......... F04D 17/00; F04D 17/02; F04D 17/08;
F04D 17/04; F04D 29/40; F04D 29/422
See application file for complete search history.

(56) References Cited

U.S. PATENT DOCUMENTS

2010/0086394 A1* 4/2010 Enomoto .............. F04D 29/181
                                                                                           415/115
2020/0040758 A1* 2/2020 Son ........................ F01D 17/12

FOREIGN PATENT DOCUMENTS

| FR | 2844560 A1 * | 3/2004 | ................ F03B 3/02 |
|----|--------------|--------|---------------------------|
| JP | 61101680 A * | 5/1986 | |
| JP | 2000297736 A | 10/2000 | |
| JP | 2003013835 A | 1/2003 | |
| JP | 2007023844 A | 2/2007 | |
| JP | 2009209716 A * | 9/2009 | |
| JP | 2010101265 A | 5/2010 | |
| JP | 2011149341 A | 8/2011 | |
| JP | 2013072304 A | 4/2013 | |

* cited by examiner

HYDRAULIC MACHINE

TECHNICAL FIELD

The present invention relates to a hydraulic machine, such as a small hydraulic power generation apparatus, used in a power generation apparatus that is required to have high power generation efficiency.

BACKGROUND ART

In recent years, reduction of carbon dioxide emissions has become a global challenge. For example, most of the world's power generation amount is covered by thermal power generation, but it is expected to increase the ratio of power generation using natural energy such as hydraulic power, geothermal power, and solar power from thermal power in order to reduce carbon dioxide emissions.

Large power plants using natural energy, such as hydroelectric power plants associated with large dams and geothermal power plants, are often located away from urban areas, which are main power consumption sites, and there is large power loss due to long-distance power transmission from a power plant to a consumption site. In addition, even if the energy source is natural energy, constructing a large dam or a large power plant in a mountain area may destroy ecosystems and nature, and may have a large environmental load.

For the above reason, it has been studied to generate power on a small scale near a power consumption site. For example, technologies for hydraulic power generation using flowing water from water channels, factory effluents, household effluents, water purification plants, and the like has been developed. Such hydraulic power generation has attracted attention as an environmentally friendly power generation method because it does not require large-scale construction in a mountain area and has a small environmental load as compared with conventional hydraulic power generation provided by the side of a large dam.

Power generation using water channels, factory effluents, and the like has smaller output fluctuation with time than solar power generation, enables stable power generation, and is excellent in facility utilization rate. In addition, since it is possible to locally produce and consume power in a region, it is a solution to power loss due to long-distance power transmission which is a problem in the case of hydraulic power generation with a large dam. In particular, there are very few cases of use of hydraulic power generation (what is called small hydraulic power generation) under conditions of a flow rate of less than 100 L/s and an effective elevation difference of 200 m or less or a power generation output of 10,000 kW or less, but there is a large room for future energy utilization, so that its widespread use is expected.

As a hydraulic power generation apparatus, various methods such as a method of rotating a screw-shaped blade in a flow of water and a method of obtaining rotational energy by a flow pressure of rotating flowing water have been proposed.

Patent Document 1 discloses a multifunctional inclined power generation apparatus that uses rotational energy obtained by passing water through a cylinder having a spiral plate closely attached to the inside thereof for power generation.

Patent Document 2 discloses a hydraulic machine including: a casing including a plurality of stay vanes disposed over a circumferential direction, a plurality of inflow direction adjusting vanes disposed on an upstream side of each stay vane and defining an inflow direction of water flowing into each stay vane, and a plurality of guide vanes to which the water passing through the stay vanes is guided; and a runner including a plurality of runner vanes and rotationally driven by the water passing through the guide vanes.

PRIOR ART DOCUMENTS

Patent Documents

Patent Document 1: JP 2011-149341 A
Patent Document 2: JP 2013-72304 A

SUMMARY OF THE INVENTION

Problems to be Solved by the Invention

In general, the conventional hydraulic power generation apparatus has a relationship that the larger the size, the higher the power generation efficiency, and the smaller the size, the lower the power generation efficiency. For example, Patent Document 1 describes that the number of stages of the spiral plate is increased or the diameter of the cylindrical body is increased in order to increase power generation efficiency, and suggests that an apparatus having high power generation efficiency is likely to be increased in size. Therefore, in a case where it is attempted to secure a certain amount or more of power generation in an area where a flow rate and an elevation difference are likely to be small, such as a non-mountainous area, even if a large high-efficiency power generation apparatus is applied, the power generation efficiency decreases, which is not appropriate. In addition, if the power generation apparatus is large, an installation place having a predetermined size and a large-scale construction are required, and thus it is desirable that the power generation efficiency is excellent while the size is appropriate.

In addition, Patent Document 2 describes that an inflow direction adjusting vane and a guide vane are provided inside a casing, a disposing position and a disposing direction of the inflow direction adjusting vane are adjusted, and an opening degree of the guide vane is adjusted in order to increase power generation efficiency of a hydraulic machine. However, such an increase in the number of types of blades inside the casing or an increase in the complexity of the shape may increase the manufacturing cost and the maintenance burden, or make it difficult to downsize the apparatus.

For the above reasons, it is desired to develop a hydraulic power generation apparatus having excellent power generation efficiency even when being smaller than a conventional large hydraulic power generation apparatus used for a dam or the like, and a hydraulic machine used for the apparatus. There are various measures for improving the power generation efficiency, but in a case where the hydraulic machine is made small, it is particularly important that the water smoothly flows in the flow path inside the hydraulic machine, the energy loss of the flowing water is suppressed as much as possible, and a uniform rotational force is loaded on the runner. In addition, it is important that the flow velocity of water in the flow path is uniform and a uniform rotational force is loaded on the runner.

The present invention has been made in view of such circumstances, and an object thereof is to provide a hydraulic machine that allows water to smoothly flow inside a flow path and is excellent in power generation efficiency. Another object of the present invention is to provide a hydraulic machine having a uniform flow rate of water inside a flow path and excellent power generation efficiency.

Means for Solving the Problem

A hydraulic machine of the present invention is a hydraulic machine including: a casing; and a runner rotatably disposed in a central portion of the casing, in which the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, the runner is connected to a main shaft along a rotation axis of the runner and includes a plurality of runner vanes disposed apart from each other in a circumferential direction, and at least one of the plurality of runner vanes has a pressure surface that receives pressure in an inflow direction from the water flowing into the runner through the fixed flow path, and, in a cross section of the runner vane perpendicular to a direction of the rotation axis, an outlet angle is 0° or more and less than 20°, the outlet angle being formed between a tangent at a tip portion on an outlet side of the water of the pressure surface and a line segment connecting the rotation axis and the tip portion on the outlet side of the pressure surface.

The hydraulic machine is a hydraulic machine used in a small hydraulic power generation apparatus.

When at least one runner vane of the plurality of runner vanes is developed into a plane including the rotation axis, each of an outer edge that is an edge on an inlet side of the water of the runner vane and an inner edge that is an edge on the outlet side of the water of the runner vane is parallel to the rotation axis, and the inner edge is longer than the outer edge.

Hereinafter, in the description of each section, a side into which water flows in in a specific member is referred to as inlet side, and a side from which water is discharged is referred to as outlet side.

The fixed flow path is formed by a plurality of stay vanes disposed apart from each other on a concentric circle, and a flow path width sequentially changes toward the center of the spiral of the main flow path, the flow path width being a length of an arc on an inner peripheral side of the fixed flow path disposed between the adjacent stay vanes among the plurality of stay vanes.

Case of Interval Reduction of Stay Vanes:

The main flow path includes an inflow portion having the inner diameter that is largest in the main flow path and a terminal end portion having the inner diameter that is smallest in the main flow path, the flow path width sequentially decreases toward the center of the spiral of the main flow path, and a reduction rate D1 of the flow path width is expressed by the following formula (1).

$$D1 = -2(L - YN - SN)/YN(N - 1) \quad (1)$$

where, N: the number of the stay vanes,
Y: a first flow path width disposed between a first stay vane extending from the inflow portion and a second stay vane adjacent to the first stay vane in a water-flowing direction,
D1: a reduction rate of the flow path widths adjacent to each other,
S: a length of an arc on an inner peripheral side of the stay vane, and
L: a length of an inner periphery of a surface of the casing in sliding contact with the runner.

Case of Interval Increase of Stay Vanes:

The main flow path includes an inflow portion having the inner diameter that is largest in the main flow path and a terminal end portion having the inner diameter that is smallest in the main flow path, the flow path width sequentially increases toward the center of the spiral of the main flow path, and an increase rate D2 of the flow path width is expressed by the following formula (2).

$$D2 = 2(L - YN - SN)/YN(N - 1) \quad (2)$$

where, N: the number of the stay vanes,
Y: a first flow path width disposed between a first stay vane extending from the inflow portion and a second stay vane adjacent to the first stay vane in a water-flowing direction,
D2: an increase rate of the flow path widths adjacent to each other,
S: a length of an arc on an inner peripheral side of the stay vane, and
L: a length of an inner periphery of a surface of the casing in sliding contact with the runner.

The plurality of runner vanes include a first runner vane and a second runner vane having a blade length shorter than a blade length of the first runner vane, the first runner vane and the second runner vane are provided alternately with each other, and the blade length of the second runner vane is 40% to 80% of the blade length of the first runner vane.

Here, the blade length of the runner vane is a length of a curve (also referred to as "camber line") obtained by connecting midpoints between a pressure surface and a negative pressure surface of the blades in order.

A hydraulic machine of the present invention is a hydraulic machine including: a casing; and a runner rotatably disposed in a central portion of the casing, in which the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, and the main flow path includes an inflow portion having an inner diameter that is largest in the main flow path and a terminal end portion having an inner diameter that is smallest in the main flow path, the terminal end portion being not connected directly to the inflow portion in the main flow path.

The main flow path has a diameter decreased with a diameter reduction ratio changing stepwise, the diameter reduction ratio being a ratio of the inner diameter on an outlet side to the inner diameter on an inlet side in a predetermined angle range.

The runner and the casing have respective sliding contact portions that slidably contact with each other, the sliding contact portion of the runner is a protruded portion having an annular shape formed on a concentric circle about a rotation axis of the runner on a surface on a side facing the casing and protruding in a discharge direction in which the water is discharged from the runner, the sliding contact portion of the casing is a groove portion having an annular shape formed on a concentric circle about the rotation axis in a runner disposing portion in which the runner is disposed, the groove portion being recessed in the discharge direction, and the protruded portion is fitted to the groove portion.

A hydraulic machine of the present invention is a hydraulic machine including: a casing; and a runner rotatably disposed in a central portion of the casing, in which the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, the fixed flow path is formed by a plurality of stay vanes disposed apart from each other on a concentric circle, and a flow path width sequentially changes toward the center of the spiral of the main flow path, the flow path width being a length of an arc on an inner peripheral side of the fixed flow path disposed between the adjacent stay vanes among the plurality of stay vanes.

Effect of the Invention

A hydraulic machine of the present invention includes: a casing; and a runner rotatably disposed in a central portion of the casing, in which the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, the runner is connected to a main shaft along a rotation axis of the runner and includes a plurality of runner vanes disposed apart from each other in a circumferential direction, and at least one of the plurality of runner vanes has an outlet angle of 0° or more and less than 20°. Therefore, a vortex is less likely to be generated in the central portion of the runner, and water is smoothly discharged without resistance. Accordingly, in the hydraulic machine of the present invention, water smoothly flows in the flow path, and power generation efficiency is excellent.

Here, the power generation efficiency is a ratio of electric energy obtained when the water changes its position by the effective elevation difference and flows into the power generation apparatus with respect to potential energy possessed by a predetermined amount of water at a predetermined effective elevation difference.

Since the hydraulic machine is a hydraulic machine used in a small hydraulic power generation apparatus, an excessively high pressure is not applied to the runner vane, and a vortex is less likely to be generated in the central portion of the runner.

When at least one runner vane of the plurality of runner vanes is developed into a plane including the rotation axis, each of an outer edge that is an edge on an inlet side of the water of the runner vane and an inner edge that is an edge on the outlet side of the water of the runner vane is parallel to the rotation axis, and the inner edge is longer than the outer edge. Therefore, the runner vane easily obtains more rotational force by increasing a contact portion with water to be discharged, and is more excellent in power generation efficiency. Since the inlet side of the runner flow path is relatively narrow, on the outer peripheral side of the runner that greatly contributes to the rotation of the runner, the flow velocity is likely to increase.

The fixed flow path is formed by a plurality of stay vanes disposed apart from each other on a concentric circle, and a flow path width sequentially changes toward the center of the spiral of the main flow path, the flow path width being a length of an arc on an inner peripheral side of the fixed flow path disposed between the adjacent stay vanes among the plurality of stay vanes. Therefore, a flow velocity of water flowing into the runner from each fixed flow path can be made uniform, and power generation efficiency can be further improved.

The flow path width sequentially decreases toward the center of the spiral of the main flow path, and the reduction rate D1 of the flow path width is expressed by the above formula (1). Therefore, the flow velocity of the water flowing through the fixed flow path connected to the second half portion of the main flow path increases. As a result, the flow velocity of the water flowing into the runner from the fixed flow path is made uniform, and the runner is loaded with a uniform rotational force over the entire circumference, so that the generation of vibration is reduced, and the power generation efficiency is further excellent.

The flow path width sequentially increases toward the center of the spiral of the main flow path, and the increase rate D2 of the flow path width is expressed by the above formula (2). Therefore, when the flow rate is relatively large and the flow velocity of the water flowing through the fixed flow path connected to the second half portion of the main flow path tends to be high, the flow velocity of the water flowing through the fixed flow path is reduced. As a result, the flow velocity of the water flowing into the runner from the fixed flow path is made uniform, and the runner is loaded with a uniform rotational force over the entire circumference, so that the generation of vibration is reduced, and the power generation efficiency is further excellent.

The plurality of runner vanes include a first runner vane and a second runner vane having a blade length shorter than a blade length of the first runner vane, the first runner vane and the second runner vane are provided alternately with each other, and the blade length of the second runner vane is 40% to 80% of the blade length of the first runner vane. Therefore, the hydraulic machine of the present invention easily obtains a rotational force from water, does not inhibit a discharge flow of water, and is further excellent in power generation efficiency.

A hydraulic machine of the present invention is a hydraulic machine including: a casing; and a runner rotatably disposed in a central portion of the casing, in which the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, and the main flow path includes an inflow portion having an inner diameter that is largest in the main flow path and a terminal end portion having an inner diameter that is smallest in the main flow path, the terminal end portion being not connected directly to the inflow portion in the main flow path. Therefore, it is possible to suppress a decrease in the flow velocity due to merging of water from the terminal end portion of the casing to the inflow portion, and the flow velocity of water in the flow path becomes uniform, and power generation efficiency is excellent.

The main flow path has a diameter decreased with a diameter reduction ratio changing stepwise, the diameter reduction ratio being a ratio of the inner diameter on an outlet side to the inner diameter on an inlet side in a predetermined angle range. Therefore, the flow velocity from the inflow portion to the terminal end portion of the main flow path can be made uniform over the entire circumference. As a result, the flow velocity of the water flowing into the runner from each fixed flow path is made uniform and the flow is made smooth, so that the generation of vibration is reduced and the power generation efficiency is more excellent.

The runner and the casing have respective sliding contact portions that slidably contact with each other, the sliding contact portion of the runner is a protruded portion having an annular shape formed on a concentric circle about a rotation axis of the runner on a surface on a side facing the casing and protruding in a discharge direction in which the water is discharged from the runner, the sliding contact portion of the casing is a groove portion having an annular shape formed on a concentric circle about the rotation axis in a runner disposing portion in which the runner is disposed, the groove portion being recessed in the discharge direction, and the protruded portion is fitted to the groove portion. Therefore, it is possible to reduce the amount of water flowing between the casing and the runner to be discharged without applying a rotational force to the runner and increase the amount of water flowing through between the runner vanes. Accordingly, since the energy of the flowing water can be efficiently used for the rotation of the runner, the hydraulic machine of the present invention is further excellent in power generation efficiency.

A hydraulic machine of the present invention is a hydraulic machine including: a casing; and a runner rotatably disposed in a central portion of the casing, in which the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, the fixed flow path is formed by a plurality of stay vanes disposed apart from each other on a concentric circle, and a flow path width sequentially changes toward the center of the spiral of the main flow path, the flow path width being a length of an arc on an inner peripheral side of the fixed flow path disposed between the adjacent stay vanes among the plurality of stay vanes. Therefore, the flow velocity of water flowing into the runner from each fixed flow path can be made uniform, and power generation efficiency is excellent.

MODE FOR CARRYING OUT THE INVENTION

Figure 1:
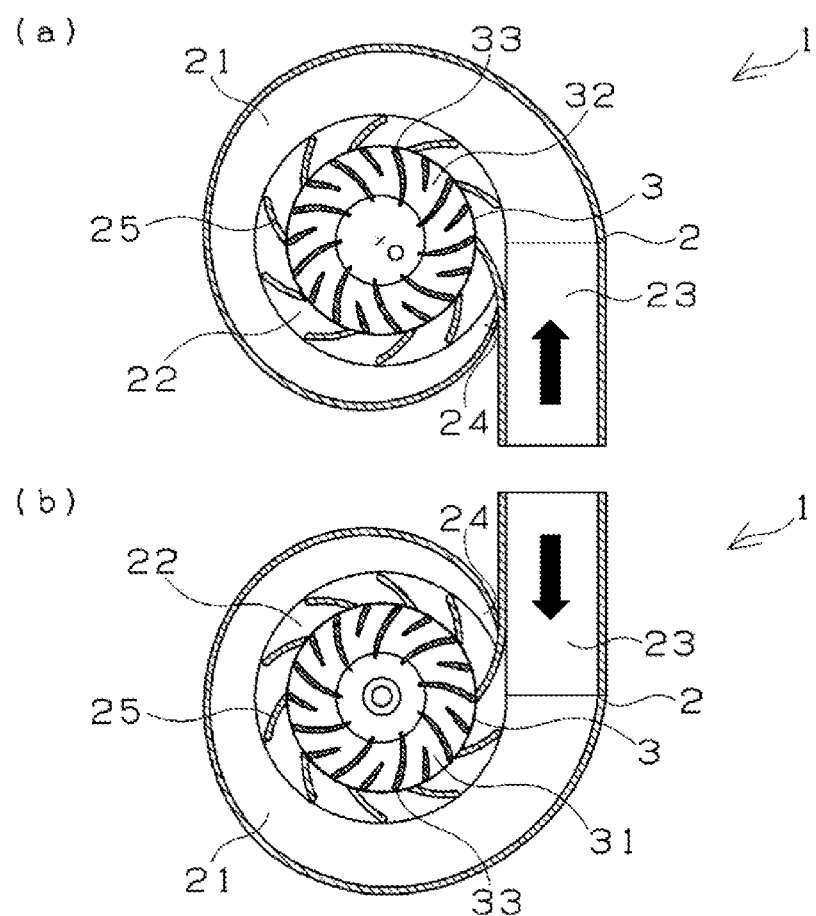
FIG. 1 is a cross-sectional view of a hydraulic machine of the present invention.

An overall structure of an example of a hydraulic machine of the present invention will be described with reference to FIG. 1. FIG. 1 is a cross-sectional view taken along a plane orthogonal to a rotation axis of a runner included in a hydraulic machine. Here, FIG. 1(a) is a view of the hydraulic machine as viewed along a direction in which water is discharged. FIG. 1(b) is a view of the hydraulic machine as viewed to face the direction in which water is discharged. In the drawings, the inflow direction of water is indicated by a black arrow.

As illustrated in FIGS. 1(a) and 1(b), a hydraulic machine 1 includes a casing 2 having a spiral shape and a runner 3 rotatably disposed in a central portion of the casing 2. The casing 2 internally includes a main flow path 21 that is a flow path disposed on the outer peripheral side of the casing 2 and having a spiral shape and an inner diameter that decreases toward the center of the spiral, and a fixed flow path 22 that is disposed on the inner peripheral side of the casing 2 and introduces water from the main flow path 21 into the runner 3. The main flow path 21 has an inflow portion 23 having the inner diameter that is largest in the main flow path and a terminal end portion 24 having an inner diameter that is smallest in the main flow path. The fixed flow path 22 is formed by a plurality of stay vanes 25 disposed apart from each other on a concentric circle.

The runner 3 is connected to a main shaft (not illustrated) along a rotation axis O of the runner 3. In addition, the runner 3 includes a crown 31 disposed on the main shaft side, a band 32 disposed apart from the crown 31, and a plurality of runner vanes 33 disposed apart from each other in the circumferential direction between the crown 31 and the band 32.

The crown, the band, and the runner vane constituting the runner may be formed of different members, or may be integrally formed. When the runner is formed of different members, the runner can be manufactured by fixing the members with screws or the like. When the runner is integrally molded, the runner can be molded by a method such as three-dimensional additive manufacturing or casting.

The casing 2 and the runner 3 illustrated in FIG. 1 are made of carbon steel. The casing and the runner can be manufactured by using alone or in combination with a metal such as carbon steel, stainless steel, and iron, a resin material such as an engineering plastic, and a composite material such as a carbon fiber reinforced plastic.

The hydraulic machine of the present invention can be used for various hydraulic power generation apparatuses. For example, the present invention can be used for a small hydraulic power generation apparatus that generates power with a relatively small amount of flowing water discharged from a water channel, a factory effluent, a household effluent, a water purification plant, or the like in a city, or a medium to large hydraulic power generation apparatus disposed in a mountain area. In particular, since the hydraulic machine of the present invention is excellent in power generation efficiency and can generate practically necessary electric power even when downsized, it is preferable to use the hydraulic machine for a small hydraulic power generation apparatus from the viewpoint of the degree of freedom of the installation place. The small hydraulic power generation apparatus is preferably used under conditions of a flow rate of less than 100 L/s and/or an effective elevation difference of 200 m or less. Furthermore, the small hydraulic power generation apparatus is preferably used under conditions of a flow rate of less than 50 L/s and/or an effective elevation difference of 100 m or less, more preferably used under conditions of a flow rate of less than 30 L/s and/or an effective elevation difference of 30 m or less, and still more preferably used under conditions of a flow rate of less than 20 L/s and/or an effective elevation difference of 20 m or less.

In addition, the small hydraulic power generation apparatus is preferably a hydraulic power generation apparatus having a power generation output of 10,000 kW or less. Furthermore, the small hydraulic power generation apparatus is preferably a hydraulic power generation apparatus having a power generation output of 1,000 kW or less, more preferably a hydraulic power generation apparatus having a power generation output of 100 kW or less, and still more preferably a hydraulic power generation apparatus having a power generation output of 10 kW or less.

When the small hydraulic power generation apparatus is used under such conditions, an excessively high pressure is not applied to the runner vane of the hydraulic machine, and a vortex is less likely to be generated in the central portion of the runner, so that power generation efficiency is further excellent.

In the hydraulic machine of the present invention, water flows through a pipe according to gravity from a position higher than a position where the hydraulic machine is disposed, and flows into an inflow portion of a casing. The inflow portion has a cylindrical straight pipe structure. The water is then guided to the runner through a fixed flow path between the plurality of stay vanes while rotating through the main flow path. The water further passes through the runner flow path between the runner vanes and is discharged from an opening of the runner, the opening being disposed to be open in the rotation axis direction at the central portion of the runner.

Figure 2:
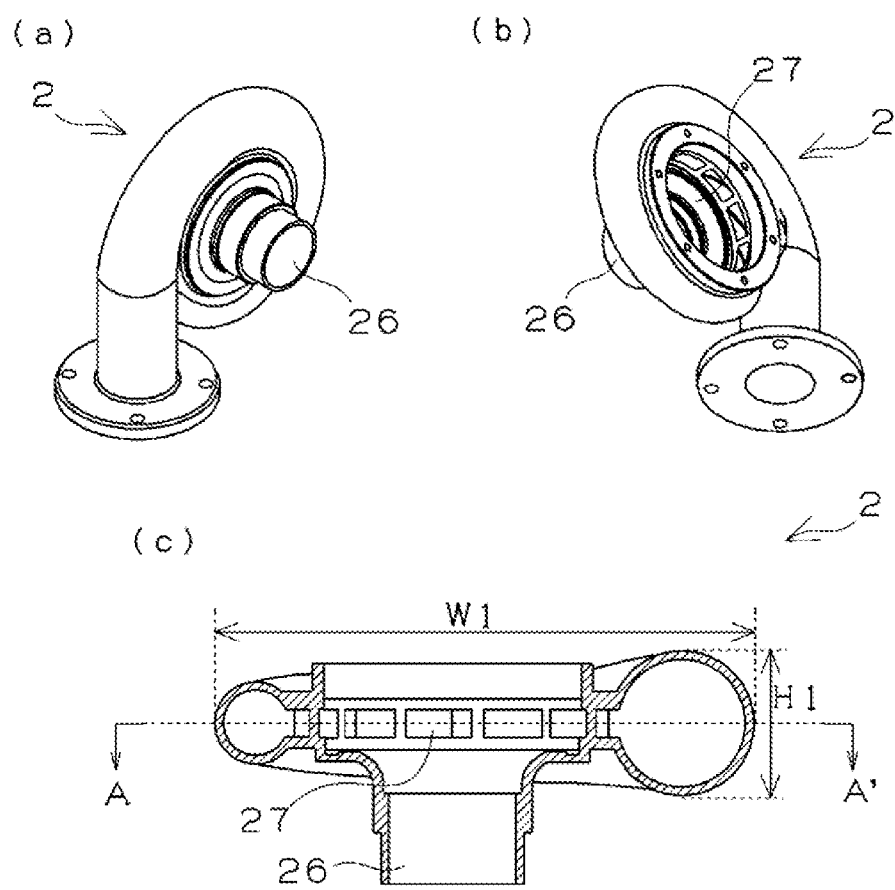
FIG. 2 is a perspective view and a sectional view of a casing included in the hydraulic machine of the present invention.

FIG. 2 illustrates a casing included in the hydraulic machine of the present invention. FIG. 2(a) is a perspective view of the casing as viewed from a side from which water is discharged, and FIG. 2(b) is a perspective view of the casing as viewed from a side into which water flows. In addition, FIG. 2(c) is a sectional view in a plane along a runner rotation axis of the casing.

As illustrated in FIG. 2, the casing 2 has a drainage portion 26 having a cylindrical shape that guides water discharged from an opening of a runner (not illustrated) to a drainage pipe. The central axis of the drainage portion 26 and the rotation axis of the runner coincide with each other. The runner can be fitted to a runner disposing portion 27 in the central portion of the casing 2.

A maximum width W1 of the casing 2 illustrated in FIG. 2(c) can be freely selected, and can be, for example, 10 cm to 100 cm. A maximum height H1 of the casing 2 is freely selected, and can be, for example, 3 cm to 30 cm. From the viewpoint of the degree of freedom of the installation place, the maximum width W1 of the casing 2 is preferably 20 cm to 60 cm. The maximum height H1 of the casing 2 is preferably 5 cm to 20 cm.

Figure 3:
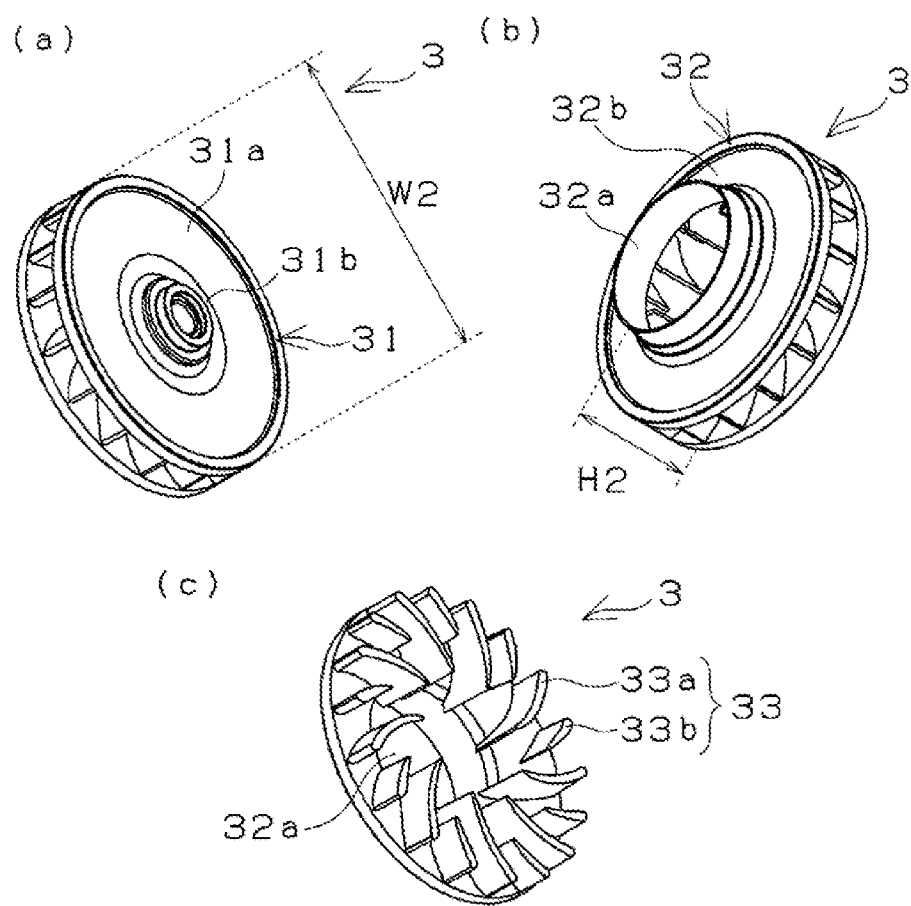
FIG. 3 is a perspective view of a runner included in the hydraulic machine of the present invention.

FIG. 3 illustrates a perspective view of a runner included in the hydraulic machine of the present invention. FIG. 3(a) is a perspective view of the runner as viewed from the crown side to which a main shaft (not illustrated) is attached, and FIG. 3(b) is a perspective view of the runner as viewed from the band side. FIG. 3(c) is a perspective view of a state in which the crown is removed in FIG. 3(a).

As illustrated in FIG. 3(a), the crown 31 has an upper disk portion 31a having a disk shape, and has an attachment portion 31b to which the main shaft is attached. As illustrated in FIG. 3(b), the band 32 has an opening 32a through which water is discharged, and has a lower disk portion 32b having a disk shape with the opening. Furthermore, as illustrated in FIG. 3(c), the runner vane 33 has a long blade 33a that reaches the opening 32a and a short blade 33b that does not reach the opening 32a. The runner 3 includes a total of 18 runner vanes 33 including 9 long blades 33a and 9 short blades 33b.

The runner may be a splitter runner having blades of different lengths as described above, or may be a runner including blades all having the same length. From the viewpoint of obtaining high power generation efficiency even at a low flow rate, a splitter runner that can easily receive a force from water and can smoothly discharge electricity is preferable.

The number of runner vanes included in the runner is not limited to 18, and can be freely set. The number of runner vanes can be, for example, 6 to 30. From the viewpoint of power generation efficiency, manufacturing cost, strength, and the like, the number of runner vanes is preferably 10 to 20, and more preferably 14 to 20.

A diameter W2 of the runner 3 can be freely selected, and can be, for example, 4 cm to 40 cm. A height H2 of the runner 3 can be freely selected, and can be, for example, 1 cm to 16 cm. From the viewpoint of the degree of freedom of the installation place, the diameter W2 of the runner 3 is preferably 8 cm to 20 cm. The height H2 of the runner 3 is preferably 1 cm to 8 cm.

Figure 4:
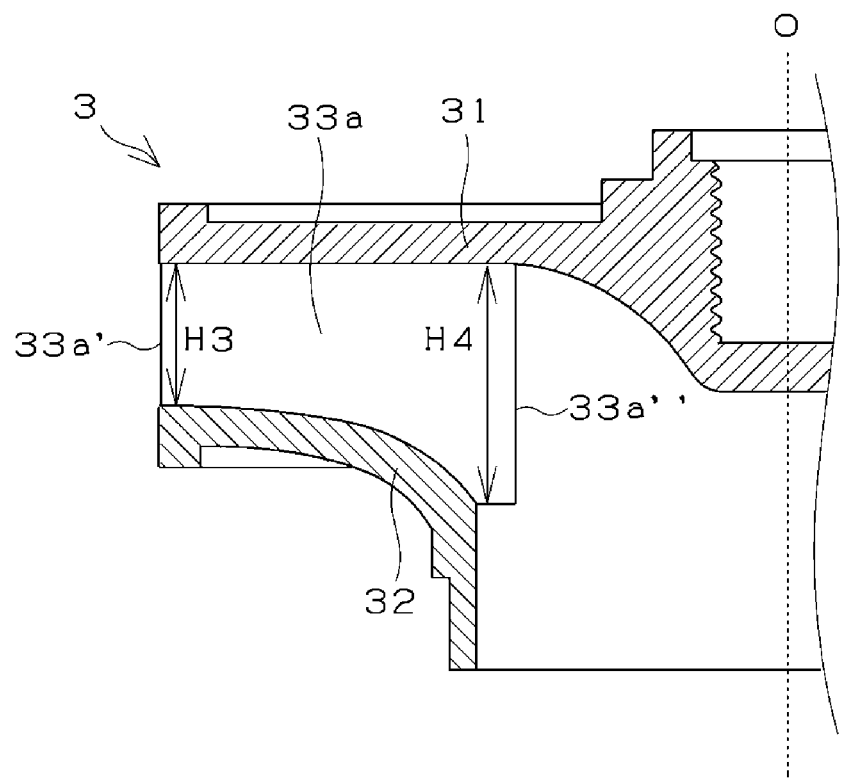
FIG. 4 is a meridian plane view of the runner included in the hydraulic machine of the present invention.

FIG. 4 is a developed view (meridian plane view) of at least one long-blade runner vane of the plurality of runner vanes of the runner included in the hydraulic machine of the present invention, on the meridian plane. The meridian plane view is a diagram in which the shape of the runner vane developed into a plane is illustrated on the sectional view of the runner on a plane including the runner rotation axis. As illustrated in FIG. 4, when the runner vane is developed on the meridian plane and viewed, the runner vane 33a of the long blade reaches the opening 32a. An outer edge 33a' that is an edge on the water inlet side and an inner edge 33a'' that is an edge on the outlet side of the runner vane 33a are each parallel to the rotation axis O of the runner, and the inner edge 33a'' is longer than the outer edge 33a'.

In at least one runner vane 33a of the plurality of runner vanes, when H4 is the length of the inner edge 33a'' and H3 is a length of the outer edge 33a', the ratio H4/H3 is, for example, 1.1 to 3.0. From the viewpoint of improving the power generation efficiency and smoothing the discharge flow, the length of the inner edge with respect to the length of the outer edge is preferably 1.3 to 2.5, and more preferably 1.5 to 2.0.

When the outer edge and the inner edge are parallel to the rotation axis of each runner and the inner edge is longer than the outer edge, the runner vane easily obtains more rotational force by increasing the contact portion with the discharged water, and is more excellent in power generation efficiency. Since the inlet side of the runner flow path is relatively narrow, on the outer peripheral side of the runner that greatly contributes to the rotation of the runner, the flow velocity is likely to increase. However, when the flow rate is excessively large or the effective elevation difference is excessively high, resistance may increase. The hydraulic machine including the runner having the runner vane of the present structure is particularly preferably used in a hydraulic power generation apparatus under the conditions of a low flow rate of less than 100 L/s and a low effective elevation difference of 200 m or less, or used in a hydraulic power generation apparatus having a power generation output of 10,000 kW or less. In addition, when the length of the inner edge is excessively long, resistance (outlet pressure) applied to discharge of water from the runner opening increases, and power generation efficiency may decrease.

Figure 5:
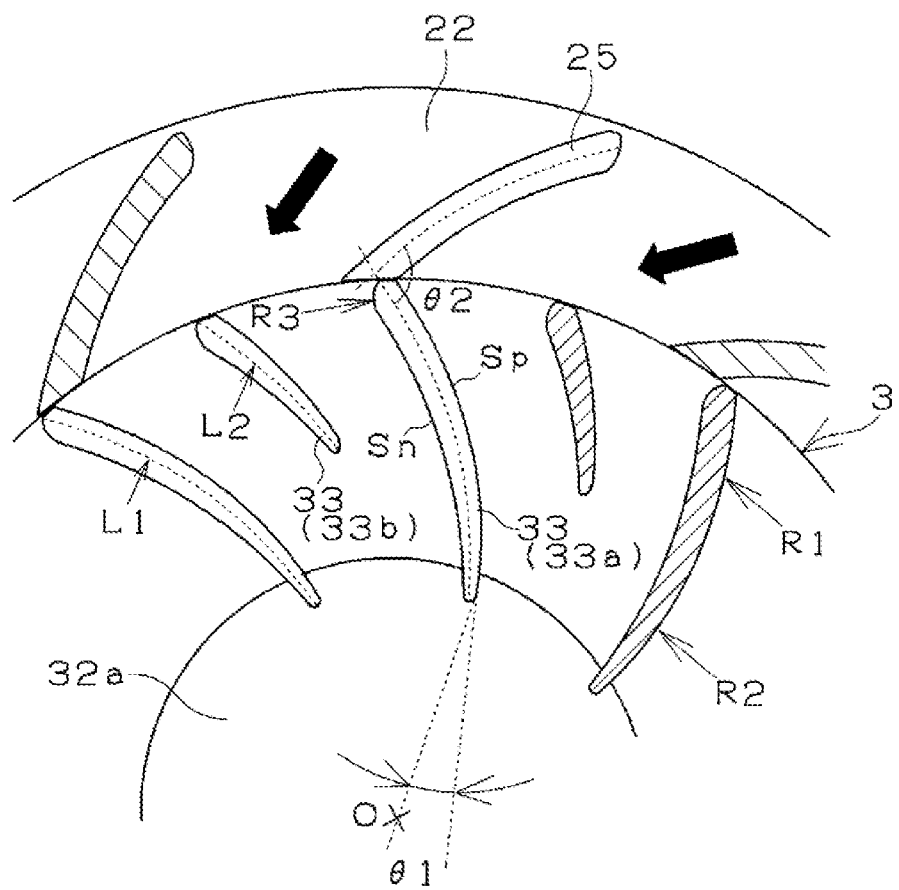
FIG. 5 is an enlarged cross-sectional view of a stay vane and the runner.

FIG. 5 illustrates an enlarged cross-sectional view of the stay vane and the runner in a plane orthogonal to the rotation axis. As illustrated in FIG. 5, the runner vane 33a, which is at least one of the plurality of runner vanes, is a long blade and reaches the opening 32a. The runner vane 33a has a pressure surface Sp that receives pressure in an inflow direction from water flowing into the runner 3 through the fixed flow path 22, and a negative pressure surface Sn that receives pressure lower than the pressure surface Sp on a back side surface of the pressure surface Sp. When the runner vane 33a is viewed in plan view from the rotation axis direction, an outlet angle θ1 formed by a tangent at a tip portion on the outlet side of the pressure surface Sp and a line segment connecting the rotation axis O and the tip portion on the outlet side of the pressure surface Sp is 0° or more and less than 20°.

Since the outlet angle θ1 of at least one runner vane is 0° or more and less than 20°, a vortex is less likely to be generated in the central portion of the runner, and water is smoothly discharged without resistance. In addition, since the outlet angle θ1 of at least one long-blade runner vane is 0° or more and less than 20°, a vortex is less likely to be generated in the central portion of the runner, and water is smoothly discharged without resistance. Accordingly, in the hydraulic machine of the present invention, water smoothly flows in the flow path, and power generation efficiency is excellent. The outlet angle θ1 is not limited to 0° or more and less than 20°, and can be freely set. From the viewpoint of reducing generation of a vortex, the outlet angle θ1 is preferably 0° or more and less than 15°, and more preferably 0° or more and less than 10°.

Furthermore, when the hydraulic machine of the present invention is used in a small hydraulic power generation apparatus, for example, used in a hydraulic power generation apparatus under the conditions of a low flow rate of less than 100 L/s and a low effective elevation difference of 200 m or less, or used in a hydraulic power generation apparatus having a power generation output of 10,000 kW or less, the specific speed is small, so that a vortex is less likely to be generated at the central portion of the runner, and water is smoothly discharged without resistance. Accordingly, water smoothly flows in the flow path, and power generation efficiency becomes further excellent. An angle of a tip portion on an outlet side of a runner vane used in a conventional large water turbine is larger than 20°, and there are many structures in which water is discharged from the runner in a circle. When such a structure is used in the small hydraulic power generation apparatus as described above, there is a possibility that a vortex is generated in the central portion of the runner and it is difficult to smoothly discharge water.

The runner illustrated in FIG. 5 is a splitter runner. The plurality of runner vanes included in the splitter runner includes a first runner vane 33a and a second runner vane 33b having a shorter blade length than the first runner vane 33a. The first runner vane 33a which is a long blade and the second runner vane 33b which is a short blade are alternately provided. A blade length L2 of the second runner vane is about 60% of a blade length L1 of the first runner vane.

In the case of the splitter runner, the blade length L1 of the first runner vane only needs to be longer than the blade length L2 of the second runner vane. From the viewpoint of improving the power generation efficiency, the blade length L2 of the second runner vane is preferably 40% to 80%, and more preferably 50% to 70%, with respect to the blade length L1 of the first runner vane. Since the blade lengths of the first runner vane and the second runner vane have the above relationship, the runner easily obtains the rotational force from the water and does not inhibit the discharge flow of the water, and the power generation efficiency of the hydraulic machine is excellent.

When the runner is simply a splitter runner in which the blade length L2 of the second runner vane is 40% to 80% of the blade length L1 of the first runner vane, the rotational force is improved, but the runner flow path is narrowed. When the runner is a splitter runner and the outlet angle θ1 of at least one long-blade runner vane of the plurality of runner vanes is brought close to 0° to smooth the discharge flow, the power generation efficiency is particularly improved.

A curvature radius R1 on the inlet side (hereinafter referred to as "inlet-side curvature radius") of the pressure surface Sp of the runner vane 33 and a curvature radius R2 on the outlet side (hereinafter referred to as "outlet-side curvature radius") of the pressure surface Sp can be freely set, and for example, the inlet-side curvature radius R1 can be set to 50 mm to 80 mm, and the outlet-side curvature radius R2 can be set to 40 mm to 70 mm. From the viewpoint of smoothing the flow of water discharged from the runner, it is preferable that the inlet-side curvature radius R1 is larger than the outlet-side curvature radius R2, the inlet-side curvature radius R1 is 50 mm to 80 mm, and the outlet-side curvature radius R2 is 40 mm to 70 mm.

In the pressure surface Sp, the inlet side is a portion of the runner vane corresponding to ½ of the blade length on the runner outer peripheral side, and the outlet side is a portion of the runner vane corresponding to ½ of the blade length on the runner inner peripheral side (opening side).

The angle θ2 formed by the tangent of the camber line tip on the outlet side of the stay vane 25 and the tangent of the camber line tip on the inlet side of the runner vane 33 can be freely set to, for example, 85° to 120°. The runner vane herein is not limited to a long blade. From the viewpoint of facilitating the runner to obtain the rotational force from the water flowing into the runner, the angle θ2 is preferably 90° to 96°, and more preferably 92° to 96°. When the angle θ2 is within the above range, this contributes to improvement of power generation efficiency. When the flow rate is large, the angle θ2 is preferably 90° to 120°, and more preferably 100° to 120° from the viewpoint of smoothing the flow.

A curvature radius R3 of the negative pressure surface Sn at the inlet-side end of the runner vane 33 can be freely set, and can be, for example, 1 mm to 10 mm. In addition, the average thickness of the runner vane 33 on the inlet side can be freely set, and can be, for example, 4 mm to 15 mm. When the average thickness on the inlet side of the runner vane is excessively thin, the flow can be made smooth, but a high load is applied to the runner vane, so that it is necessary to secure a certain strength or more. Therefore, it is effective to define the curvature radius R3 in order to smooth the flow of water with maintaining the above thickness and suppress cavitation. The curvature radius R3 is preferably 2 mm to 8 mm from the viewpoint of smoothing the flow on the negative pressure surface side, suppressing the generation of cavitation, addressing a high elevation difference, and the like. When the curvature radius R3 of the runner vane is within the above range, it leads to suppression of variation in the rotational force and vibration of the runner, and power generation efficiency is improved. In addition, since it is possible to reduce the situation in which the stay vane and the runner vane are close to each other, pressure (simultaneous pressure) simultaneously generated in the stay vane and the runner vane is less likely to be applied, which contributes to suppression of vibration and noise and to improvement of power generation efficiency. If the angle θ2 is close to 90°, cavitation may occur in some cases on the negative pressure surface side when the flow velocity increases. Even in this case, when the curvature radius R3 is 2 mm to 8 mm, water smoothly flows into the negative pressure surface side, and the occurrence of cavitation is suppressed.

Figure 6:
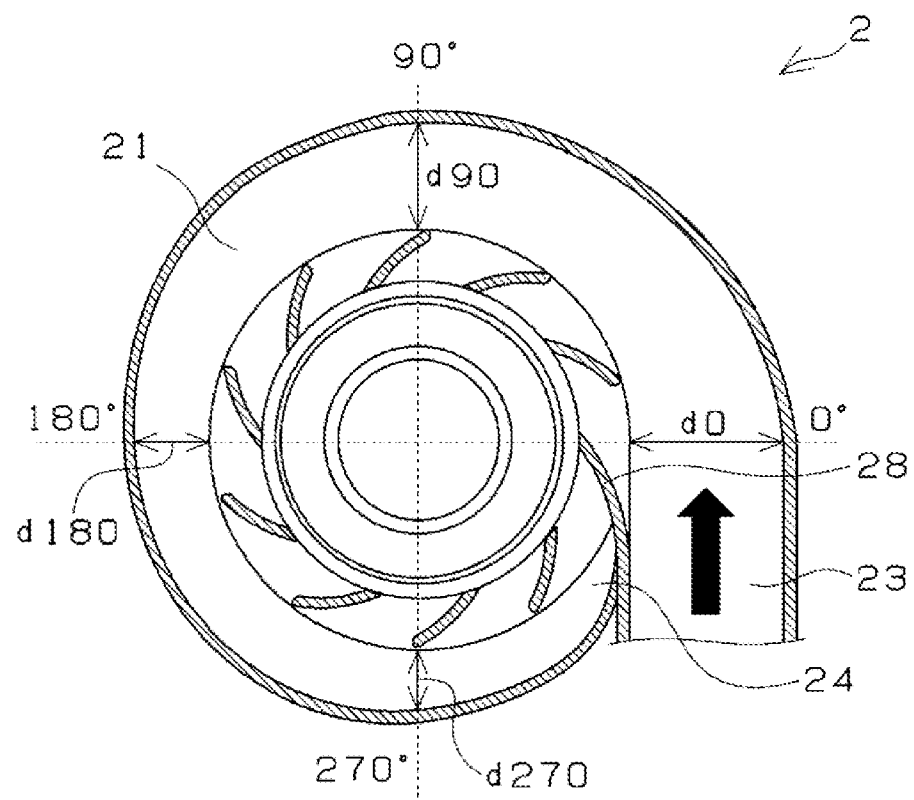
FIG. 6 is a cross-sectional view of the casing included in the hydraulic machine of the present invention.

FIG. 6 is a cross-sectional view of the casing included in the hydraulic machine of the present invention taken along a plane orthogonal to the runner rotation axis. The present cross-sectional view is a cross-sectional view taken along line A-A' in FIG. 2. As illustrated in FIG. 6, the space between the terminal end portion 24 of the main flow path 21 and the inflow portion 23 is partitioned by a first stay vane 28 extending from the inflow portion 23, the terminal end portion 24 and the inflow portion 23 do not communicate with each other, and the respective portions are not directly connected (hereinafter also referred to as "non-penetrating structure").

When the main flow path has the non-penetrating structure as described above, all the water flowing into the casing flows toward the runner through the fixed flow path. Therefore, as compared with the case of a structure in which there is no partition between the terminal end portion and the inflow portion and they are directly connected (hereinafter also referred to as "penetrating structure"), the flow around the main flow path does not flow from the terminal end portion to the inflow portion again, so that the flow velocity of water in the flow path becomes uniform and energy loss due to merging does not occur. As a result, the hydraulic machine of the present invention is excellent in power generation efficiency.

In the casing having the main flow path of the non-penetrating structure, under the condition of an excessively large flow rate, the flow of water at the terminal end portion may become stagnant (become high resistance), and the loss of energy may increase. Therefore, the hydraulic machine of the present invention is preferably used in a small hydraulic power generation apparatus under the conditions of a low flow rate of less than 100 L/s and a low effective elevation difference of 200 m or less, or used in a hydraulic power generation apparatus having a power generation output of 10,000 kW or less. In this case, the flow of water is less likely to stagnate and the resistance becomes low, and the power generation efficiency is further excellent.

The inner diameter of the main flow path may be continuously decreased at a predetermined change rate toward the center of the spiral, or the inner diameter may be gradually decreased by connecting the flow paths having a constant inner diameter such that the inner diameter stepwisely becomes smaller. In addition, a continuous diameter reduction of the inner diameter and a stepwise diameter reduction of the inner diameter may be combined.

The main flow path may have a diameter decreased with a diameter reduction ratio changing stepwise, the diameter reduction ratio being a ratio of the inner diameter on an outlet side to the inner diameter on an inlet side in a predetermined angle range. Regarding the diameter reduction ratio, for example, the diameter reduction ratio may increase or decrease in the first half portion, the intermediate portion, and the second half portion of the main flow path. The diameter reduction ratio can be set, for example, such that the inner diameter decreases by 5% to 35% every 45° or 90° advance toward the center of the spiral.

For example, in the main flow path 21 of FIG. 6, the inner diameter d90 at a position of 90° from the downstream end portion of the inflow portion 23 toward the center of the spiral is smaller than the inner diameter do of the downstream end portion of the inflow portion 23 by about 20 to 30%. In addition, an inner diameter d180 at a position of 180° from the downstream end of the inflow portion 23 toward the center of the spiral is smaller than the inner diameter d90 by slightly more than 30%. Furthermore, an inner diameter d270 at a position of 270° from the downstream end of the inflow portion 23 toward the center of the spiral is smaller than the inner diameter d180 by slightly more than 20 to 30%. In this manner, the diameter reduction ratio of the intermediate portion of the main flow path may be larger than the diameter reduction ratios of the first half portion and the second half portion.

By combining the non-penetrating structure and defining the inner diameter at the predetermined position as described above, the flow velocity from the inflow portion to the terminal end portion of the main flow path is made uniform over the entire circumference. As a result, the flow of water is made smooth, so that the generation of vibration is reduced and the power generation efficiency is more excellent.

Figure 7:
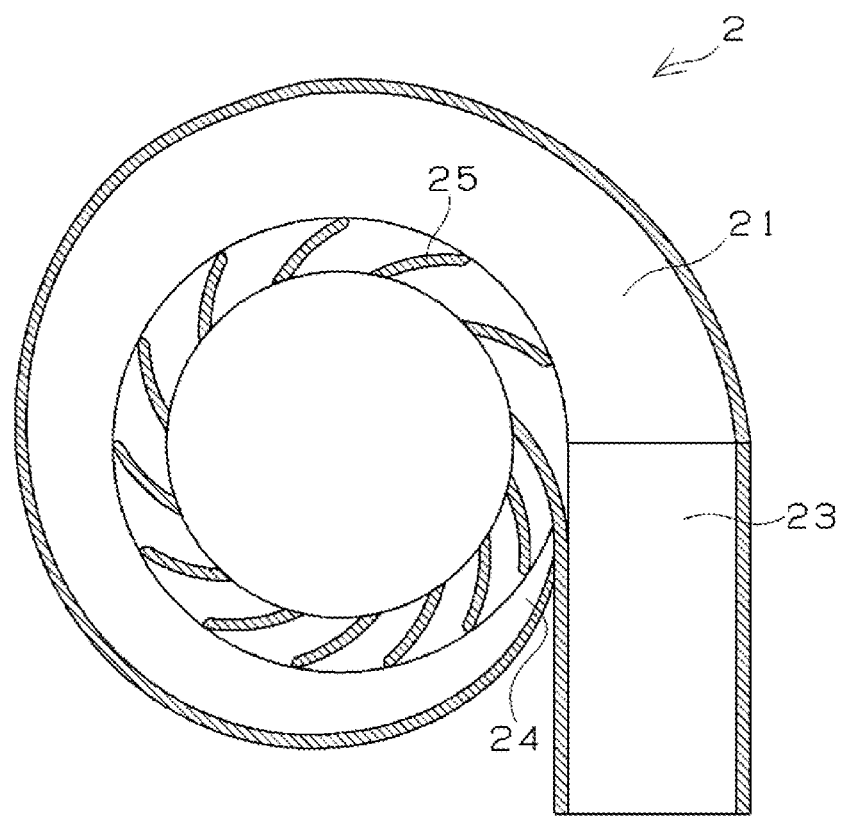
FIG. 7 is a cross-sectional view of the casing in which a stay vane interval changes.

FIG. 7 illustrates a cross-sectional view of an exemplary casing included in the hydraulic machine of the present invention, taken along a plane orthogonal to a runner rotation axis of the casing in which a stay vane interval changes. As illustrated in FIG. 7, for the plurality of stay vanes 25 inside the casing 2, the interval between the plurality of stay vanes 25 adjacent to each other sequentially decreases toward the center of the spiral from the inflow portion 23 of the main flow path 21 to the terminal end portion 24. The flow path widths of the plurality of fixed flow paths connected to the first half portion of the main flow path (main flow path inlet side) may be constant, and the flow path widths of the plurality of fixed flow paths connected to the main flow path from the intermediate portion to the second half portion may sequentially decrease. The same applies to a case described later where the flow path width sequentially increases toward the center of the spiral of the main flow path.

(Case of Flow Path Width Reduction)

Figure 8:
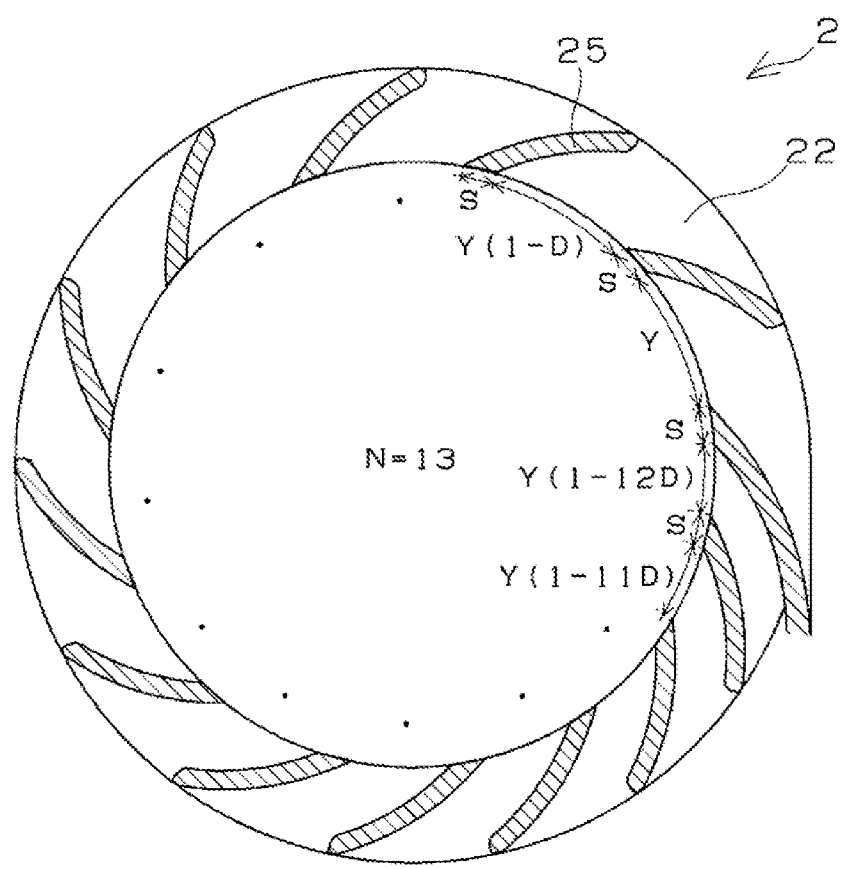
FIG. 8 is an enlarged cross-sectional view of a stay vane portion of the casing illustrated in FIG. 7.

FIG. 8 illustrates an enlarged cross-sectional view of a stay vane portion of the casing illustrated in FIG. 7. As illustrated in FIG. 8, the flow path width, which is the length of an arc on the inner peripheral side of the fixed flow path 22 disposed between the adjacent stay vanes 25 among the plurality of stay vanes 25, sequentially decreases toward the center of the spiral of the main flow path.

Here, the reduction rate D1 of the flow path width is expressed by the following formula (1).

$$D1 = -2(L - YN - SN)/YN(N - 1) \qquad (1)$$

where, N: the number of the stay vanes,
Y: a first flow path width disposed between the first stay vane extending from the inflow portion and the second stay vane adjacent to the first stay vane in the water-flowing direction,
D1: a reduction rate of flow path widths adjacent to each other,
S: a length of the arc on the inner peripheral side of the stay vane, and
L: a length of an inner periphery the surface of the casing in sliding contact with the runner.

In the second half portion of the main flow path, the flow velocity tends to increase due to the effect of reducing the inner diameter, but this makes it difficult for water to flow to the stay vane side, and the flow velocity in the fixed flow path connected to the second half portion of the main flow path may become slow in some cases. In such a case, by setting the interval between the adjacent stay vanes on the basis of the above equation, the flow path width of the fixed flow path connected to the second half portion of the main flow path is narrowed and the flow velocity is increased. As a result, the flow velocity of the water flowing into the runner from the fixed flow path is made uniform, and the runner is loaded with a uniform rotational force over the entire circumference, so that the generation of vibration is reduced, and the power generation efficiency is further excellent.

(Case of Flow Path Width Increase)

The casing included in the hydraulic machine of the present invention is not limited to the above-described casing in which the flow path width, which is the length of the arc on the inner peripheral side of the fixed flow path disposed between the adjacent stay vanes among the plurality of stay vanes, sequentially decreases toward the center of the spiral of the main flow path. The flow path width may sequentially increase, for example, toward the center of the spiral of the main flow path. In this case, the increase rate D2 of the flow path width is expressed by the following formula (2).

$$D2 = 2(L - YN - SN)/YN(N - 1) \qquad (2)$$

where, N: the number of the stay vanes,

Y: the first flow path width disposed between the first stay vane extending from the inflow portion and the second stay vane adjacent to the first stay vane in water-flowing direction, D2: an increase rate of the adjacent flow path widths, S: a length of the arc on the inner peripheral side of the stay vane, and L: a length of an inner periphery the surface of the casing in sliding contact with the runner.

When the flow rate is relatively large, water flows between the stay vanes even if the flow velocity in the second half portion of the main flow path is large, and the flow velocity of water flowing through the fixed flow path connected to the second half portion of the main flow path may also be large in some cases. In such a case, by setting the interval between the adjacent stay vanes on the basis of the above formula, the interval between the stay vanes is sequentially widened, and the flow velocity of the water flowing through the fixed flow path connected to the second half portion of the main flow path is reduced. As a result, the flow velocity of the water flowing into the runner from the fixed flow path is made uniform, and the runner is loaded with a uniform rotational force over the entire circumference, so that the generation of vibration is reduced, and the power generation efficiency is further excellent.

Sequentially changing the interval (flow path width) between the plurality of stay vanes and reducing the inner diameter of the main flow path toward the center of the spiral of the main flow path are methods of uniformizing the flow velocity over the entire circumference. However, by combining these methods, uniformization of the flow velocity over the entire circumference is more easily achieved. In the case of using a hydraulic machine in an environment where a flow rate change is likely to greatly fluctuate, it is easy to adjust an interval (a flow path width of a fixed flow path) between the plurality of stay vanes, which is preferable.

By changing the interval between the stay vanes, rounding the negative pressure surface at the inlet-side end of the runner vane, and setting the curvature radius R3 (see FIG. 5) to 2 mm to 8 mm, simultaneous pressure is less likely to occur, leading to reduction of vibration.

The casing 2 includes 13 stay vanes 25. The number of stay vanes can be freely set, and can be, for example, 5 to 30. From the viewpoint of reducing simultaneous pressure application to the stay vanes and the runner vanes, the number of runner vanes is larger than the number of stay vanes, and the number of stay vanes is preferably 5 to 20, and more preferably 8 to 15. When the number of stay vanes is within the above range, simultaneous pressure is less likely to be applied to the stay vanes and the runner vanes, whereby vibration and noise are suppressed, and power generation efficiency is improved.

The number of stay vanes, the number of runner vanes, the length of the arc on the inner peripheral side of the stay vane, and the length of the arc on the outer peripheral side of the runner vane are preferably set to satisfy the following formula (3).

Nx=a numerical order of a blade positioned at an x-th position counted to left from a state where the runner vanes and stay vanes are overlapped with each other $N_S$=the number of stay vanes $N_R$=the number of runner vanes S=a length of an arc on an inner peripheral side of the stay vane T=a length of an arc on an outer peripheral side of the runner vane $R_4$=a radius of the runner Here, T is specifically a length of an arc on the outer periphery of the runner formed when tangents at the tip portions of the pressure surface and the negative pressure surface on the inlet side of the runner vane are extended in the outer peripheral direction.

[Mathematical Formula 1]

$$\frac{Nx \times 360°}{N_S} - \frac{Nx \times 360°}{N_R} \geqq (S + T) \times \frac{360°}{2 \pi R_4} \qquad (3)$$

When the stay vane and the runner vane satisfy the above formula, the x-th stay vane and the runner vane do not overlap each other, and the positional relationship is the same as or more than the angle corresponding to the sum of the arc length S on the inner peripheral side of the stay vane and the arc length T on the outer peripheral side of the runner vane. Accordingly, simultaneous pressure is less likely to be applied to the stay vanes and the runner vanes, whereby vibration and noise are suppressed, and power generation efficiency is improved.

Figure 9:
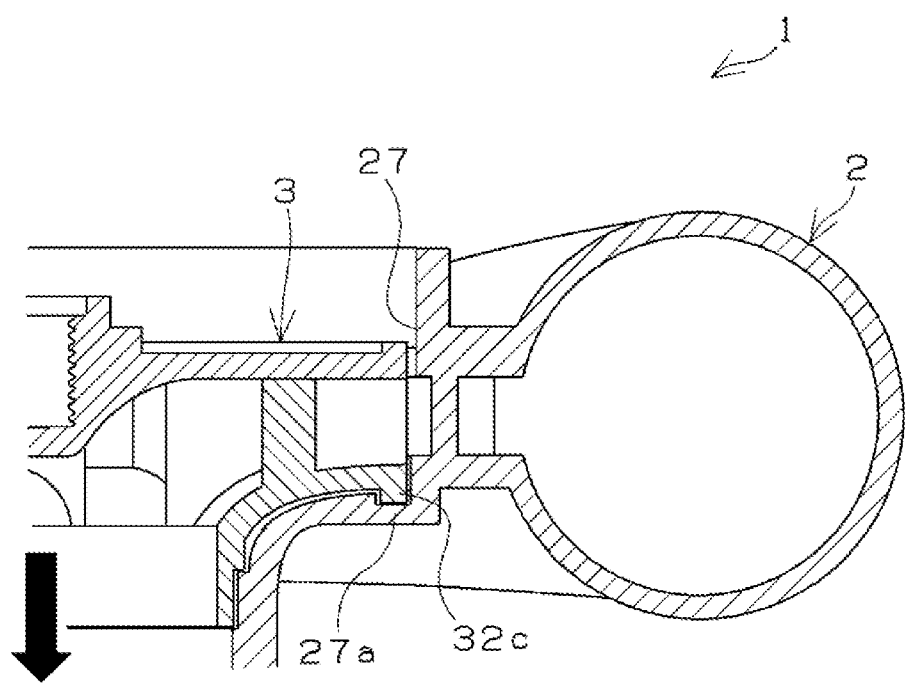
FIG. 9 is an enlarged sectional view of a sliding contact portion between the casing and the runner.

FIG. 9 illustrates an enlarged sectional view of a sliding contact portion between the casing and the runner taken along the runner rotation axis. As illustrated in FIG. 9, the runner 3 and the casing 2 have respective sliding contact portions that slidably contact with each other. The sliding contact portion of the runner 3 is a protruded portion 32c having an annular shape that is formed on a concentric circle about the rotation axis on the surface of the casing on the side where the runner 3 faces the runner disposing portion 27 and protrudes in a discharge direction (a direction of a black arrow) that is a direction in which water is discharged from the runner 3. The sliding contact portion of the casing 2 is a groove portion 27a having an annular shape that is formed on a concentric circle about the axial center of the main shaft in the runner disposing portion 27 in which the runner 3 is disposed and is recessed in the discharge direction. The protruded portion 32c is fitted to the groove portion 27a with a slight gap.

The gap between the protruded portion and the groove portion can be freely set, and can be, for example, 0.5 mm to 5 mm. From the viewpoint of slidability of the runner with respect to the casing and reduction of the amount of water leaking from the gap, the gap between the protruded portion and the groove portion is preferably 1 mm to 3 mm. When the gap between the protruded portion and the groove portion is within the above range, the amount of water that flows between the casing and the runner and is discharged without applying a rotational force to the runner can be reduced, and the amount of water that flows between the runner vanes can be increased. Accordingly, since the energy of the flowing water can be efficiently used for the rotation of the runner, the hydraulic machine of the present invention is further excellent in power generation efficiency.

The hydraulic machine of the present invention may be provided with a detection system such as an acceleration sensor that measures acceleration acting on the hydraulic machine, a current/voltage sensor capable of measuring current and voltage, a camera capable of capturing an appearance photograph or an appearance moving image, and a human sensor capable of detecting when a person or an animal approaches.

For example, the acceleration sensor can be attached to the vicinity of the rotation axis of the hydraulic machine to detect the movement values of the X, Y, and Z axes, and when the movement values exceed a set threshold, the acceleration sensor can notify the administrator by e-mail or the like. For example, the current/voltage sensor can detect a current value and a voltage value by attaching a clamp sensor to a three-phase AC wiring from a generator, and notify an administrator by e-mail or the like when the current value and the voltage value exceed a set threshold. The moving values of the X, Y, and Z axes, the current value, and the voltage value can be confirmed by a graph in real time on the WEB. The data acquisition interval is, for example, every 1 second, and may be acquired every 0.5 seconds to every day depending on the installation environment. For example, the camera can be installed around the hydraulic machine, and the camera can be activated at a fixed time to take an appearance photograph or an appearance moving image to notify the administrator by e-mail or the like whether there is a trouble such as damage, impact, or disaster. As a result, since the administrator can quickly respond to the occurrence of an abnormality such as a disaster or mixing of foreign matter into the hydraulic machine, power generation can be continuously performed.

The various detection systems described above may include a prediction system that performs data analysis on the basis of acquired information and performs future abnormality occurrence prediction. The prediction system notifies the administrator of the predicted information, and the administrator handles the information, thereby avoiding failure of the hydraulic machine.

The hydraulic machine of the present invention has been described above with reference to the drawings, but is not limited to the above-described configuration.

INDUSTRIAL APPLICABILITY

The hydraulic machine of the present invention allows water to smoothly flow in a flow path and has excellent power generation efficiency. In addition, since the flow velocity of water in the flow path is uniform, it can be widely used for power generation applications using flowing water from water channels, factory effluents, household effluents, water purification plants, and the like.

REFERENCE SIGNS LIST 1 hydraulic machine
2 casing
21 main flow path
22 fixed flow path
23 inflow portion
24 terminal end portion
25 stay vane
26 drainage portion
27 runner disposing portion
27a groove portion
28 first stay vane
3 runner
31 crown
31a upper disk portion
31b attachment portion
32 band
32a opening
32b lower disk portion
32c protruded portion
33 runner vane
33a long blade
33a' outer edge
33a" inner edge
33b short blade
H1 maximum height of casing
H2 height of runner
H3 length of outer edge
H4 length of inner edge
L1 blade length of first runner vane
L2 blade length of second runner vane
W1 maximum width of casing
W2 diameter of runner
O rotation axis

The invention claimed is:

1. A hydraulic machine comprising:
a casing; and
a runner rotatably disposed in a central portion of the casing, wherein
the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner,
the runner is connected to a main shaft along a rotation axis of the runner and includes a plurality of runner vanes disposed apart from each other in a circumferential direction, and
at least one of the plurality of runner vanes has a pressure surface that receives pressure in an inflow direction from the water flowing into the runner through the fixed flow path, and, in a cross section of the runner vane perpendicular to a direction of the rotation axis, an outlet angle is 0° or more and less than 20°, the outlet angle being formed between a tangent at a tip portion on an outlet side of the water of the pressure surface and a line segment connecting the rotation axis and the tip portion on the outlet side of the pressure surface, wherein the fixed flow path is formed by a plurality of stay vanes disposed apart from each other on a concentric circle, a flow path width sequentially changes toward the center of the spiral of the main flow path, the flow path width being a length of an arc on an inner peripheral side of the fixed flow path disposed between the adjacent stay vanes among the plurality of stay vanes, wherein the main flow path includes an inflow portion having an inner diameter that is largest in the main flow path and a terminal end portion having an inner diameter that is smallest in the main flow path, the flow path width sequentially decreases toward the center of the spiral of the main flow path, and a reduction rate D1 of the flow path width is expressed by the following formula (1), $$D1 = -2(L - YN - SN)/YN(N - 1) \qquad (1)$$

where, N is the number of the stay vanes,

Y is a first flow path width disposed between a first stay vane extending from the inflow portion and a second stay vane adjacent to the first stay vane in a water-flowing direction, D1 is a reduction rate of the flow path widths adjacent to each other, S is a length of an arc on an inner peripheral side of the stay vane, and L is a length of an inner periphery of a surface of the casing in sliding contact with the runner.

2. The hydraulic machine according to claim 1, wherein the hydraulic machine is a hydraulic machine used in a small hydraulic power generation apparatus.

3. The hydraulic machine according to claim 1, wherein, when at least one runner vane of the plurality of runner vanes is developed into a plane including the rotation axis, each of an outer edge that is an edge on an inlet side of the water of the runner vane and an inner edge that is an edge on the outlet side of the water of the runner vane is parallel to the rotation axis, and the inner edge is longer than the outer edge.

4. The hydraulic machine according to claim 1, wherein the plurality of runner vanes include a first runner vane and a second runner vane having a blade length shorter than a blade length of the first runner vane, the first runner vane and the second runner vane are provided alternately with each other, and the blade length of the second runner vane is 40% to 80% of the blade length of the first runner vane.

5. A hydraulic machine comprising:

a casing; and a runner rotatably disposed in a central portion of the casing, wherein the casing internally includes a main flow path and a fixed flow path, the main flow path being a flow path disposed outward and having a spiral shape and an inner diameter that decreases toward a center of the spiral, the fixed flow path being disposed inward and introducing water from the main flow path into the runner, the runner is connected to a main shaft along a rotation axis of the runner and includes a plurality of runner vanes disposed apart from each other in a circumferential direction, and at least one of the plurality of runner vanes has a pressure surface that receives pressure in an inflow direction from the water flowing into the runner through the fixed flow path, and, in a cross section of the runner vane perpendicular to a direction of the rotation axis, an outlet angle is 0° or more and less than 20°, the outlet angle being formed between a tangent at a tip portion on an outlet side of the water of the pressure surface and a line segment connecting the rotation axis and the tip portion on the outlet side of the pressure surface, wherein the fixed flow path is formed by a plurality of stay vanes disposed apart from each other on a concentric circle, a flow path width sequentially changes toward the center of the spiral of the main flow path, the flow path width being a length of an arc on an inner peripheral side of the fixed flow path disposed between the adjacent stay vanes among the plurality of stay vanes, wherein the main flow path includes an inflow portion having an inner diameter that is largest in the main flow path and a terminal end portion having an inner diameter that is smallest in the flow path, the flow path width sequentially increases toward the center of the spiral of the main flow path, and an increase rate D2 of the flow path width is expressed by the following formula (2)

$$D2 = 2(L - YN - SN)/YN(N - 1) \qquad (2)$$

where, N is the number of the stay vanes,

Y is a first flow path width disposed between a first stay vane extending from the inflow portion and a second stay vane adjacent to the first stay vane in a water flowing direction, D2 is an increase rate of the flow path widths adjacent to each other, S is a length of an arc on an inner peripheral side of the stay vane, and L is a length of an inner periphery of a surface of the casing in sliding contact with the runner.

* * * * *